(12) United States Patent
Gundlach

(10) Patent No.: US 7,438,179 B2
(45) Date of Patent: Oct. 21, 2008

(54) ABRASION-RESISTANT HINGE RODS IN MODULAR PLASTIC CONVEYOR BELTS

(75) Inventor: James O. Gundlach, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 11/468,400

(22) Filed: Aug. 30, 2006

(65) Prior Publication Data

US 2008/0067040 A1    Mar. 20, 2008

(51) Int. Cl.
B65G 17/06    (2006.01)
(52) U.S. Cl. ................ 198/851; 474/216
(58) Field of Classification Search ......... 198/850–853, 198/848; 474/212, 213, 215, 216
See application file for complete search history.

(56) References Cited

U.S. PATENT DOCUMENTS

| | | | |
|---|---|---|---|
| 1,564,798 A | | 12/1925 | Sturtevant |
| 1,651,832 A | * | 12/1927 | Morse ............ 474/216 |
| 1,755,887 A | * | 4/1930 | Morse ............ 474/216 |
| 1,822,749 A | * | 9/1931 | Rothman ......... 474/215 |
| 2,096,061 A | * | 10/1937 | Barnes ........... 474/215 |
| 2,989,332 A | | 6/1961 | Bonmartoni |
| 3,392,819 A | | 7/1968 | Waite |
| 3,628,392 A | | 12/1971 | Ivashkov et al. |
| 3,742,776 A | | 7/1973 | Avramidis |
| 3,980,173 A | | 9/1976 | Riggs |
| 4,010,656 A | | 3/1977 | Jeffrey |
| 4,130,026 A | | 12/1978 | Jeffrey |
| 4,140,025 A | | 2/1979 | Lapeyre |
| 4,186,617 A | | 2/1980 | Avramidis et al. |
| 4,195,887 A | * | 4/1980 | Ruddell ........... 198/853 |

(Continued)

FOREIGN PATENT DOCUMENTS

GB    2108456 A    5/1981

(Continued)

OTHER PUBLICATIONS

European Patent Office, Search Report of International Patent Application No. PCT/US07/76377, Dec. 21, 2007, European Patent Office, Rijswijk, NL.

*Primary Examiner*—James R Bidwell
(74) *Attorney, Agent, or Firm*—James T. Cronvich

(57) ABSTRACT

A modular plastic conveyor belt formed by rows of belt modules connected together at hinge joints by non-circular hinge rods. Each hinge rod has an arcuate outer face that forms a portion of a cylinder and extends circumferentially over a first angle preferably between 90° and 180°. An axial groove is formed in the hinge rod opposite its arcuate outer face. Openings in hinge eyes at opposite ends of the belt rows are sector-shaped. The openings along a leading edge of a row are shaped to receive a hinge rod snugly with little clearance. The openings along a trailing edge of an adjacent row have similar radial dimensions, but extend circumferentially over a second angle greater than the first angle. The hinge eyes of adjacent rows are interleaved and aligned to receive a hinge rod and give the hinge joint a range of articulation. Protrusions extending into the openings are received in the grooves in the hinge rod to register the hinge rod in the joint to limit vertical motion of the rod in the extended openings.

16 Claims, 2 Drawing Sheets

U.S. PATENT DOCUMENTS

| | | | |
|---|---|---|---|
| 4,507,106 A | 3/1985 | Cole, Jr. | |
| 4,782,940 A | 11/1988 | Hogg | |
| 5,083,659 A | 1/1992 | Bode et al. | |
| 5,114,384 A * | 5/1992 | Tsuyama | 474/212 |
| 5,125,874 A | 6/1992 | Fryer et al. | |
| 5,372,554 A | 12/1994 | Okuda | |
| 5,375,697 A | 12/1994 | Battati et al. | |
| 5,431,275 A | 7/1995 | Faulkner | |
| 5,433,313 A | 7/1995 | Deschner | |
| 5,906,270 A | 5/1999 | Faulkner | |
| 5,941,059 A | 8/1999 | Kanehira et al. | |
| 6,059,097 A | 5/2000 | Clopton | |
| 6,135,908 A | 10/2000 | Greiter | |
| 6,186,921 B1 * | 2/2001 | Kotera | 474/215 |
| 6,213,292 B1 | 4/2001 | Takahashi et al. | |
| 6,360,881 B2 | 3/2002 | Stebnicki et al. | |
| 6,364,094 B1 | 4/2002 | Alstmar et al. | |
| 6,387,003 B2 | 5/2002 | Horie et al. | |
| 6,439,378 B1 | 8/2002 | MacLachlan | |
| 6,474,464 B1 | 11/2002 | Horton et al. | |
| 6,736,259 B1 | 5/2004 | Funabashi | |
| 6,749,059 B2 * | 6/2004 | Gundlach et al. | 198/851 |
| 6,758,328 B2 | 7/2004 | Arai et al. | |
| 6,910,572 B2 | 6/2005 | Shibayama et al. | |
| 6,918,486 B2 | 7/2005 | Shibayama et al. | |
| 7,055,678 B2 | 6/2006 | Gundlach et al. | |
| 2003/0141172 A1 | 7/2003 | Arai et al. | |

FOREIGN PATENT DOCUMENTS

NL  1021514 C1  3/2004

\* cited by examiner

ABRASION-RESISTANT HINGE RODS IN MODULAR PLASTIC CONVEYOR BELTS

BACKGROUND

The invention relates generally to power-driven modular plastic conveyor belts and, more particularly, to modular plastic conveyor belts hingedly interconnected row to row by non-circular hinge rods.

Conventional modular conveyor belts and chains are constructed of modular links, or belt modules, arranged in rows. Spaced apart hinge eyes extending from each end of the modules include aligned openings. The hinge eyes along one end of a row of modules are interleaved with the hinge eyes of an adjacent row. A hinge rod, journaled in the aligned openings of interleaved hinge eyes, connects adjacent rows together end to end to form an endless conveyor belt capable of articulating about a drive sprocket or drum.

Because modular plastic conveyor belts do not corrode and are easy to clean, they are often used instead of metal belts. Usually the hinge rods in plastic belts are also made of plastic. The hinge rods are typically circular in cross section and reside in circular openings in the hinge eyes. Relative motion between the hinge rods and the walls of the hinge eyes as the belt articulates about sprockets tends to wear both the hinge rod and the hinge eye wall. In abrasive environments, such as in conveying potatoes and other agricultural produce, this wear is accelerated by the intrusion of dirt and grit into the hinges of the belt.

Metal hinge rods are sometimes used to increase the wear life of the rods. But that does not do away with the relative motion between rod and hinge eye wall, and belt module wear at the hinge is still a problem.

Non-circular hinge strips made of a flexible material have been proposed to resist wear. Hinge eyes forming slots with flared ends permit the confined hinge strip to flex a limited angle without frictionally rubbing with the hinge eyes as the belt articulates. Such an arrangement is effective in increasing wear life, but the flexible hinge strip is inherently weak in shear strength and unsuitable for carrying heavy loads.

U.S. Pat. No. 7,055,678 discloses a barrel-shaped hinge rod that is retained snugly in the hinge eyes along one belt row. The openings in the interleaved hinge eyes of the adjacent row are larger to allow the belt to articulate at the hinge between the adjacent rows. But the larger opening affords the hinge rod clearance that results in undesirable motion and rubbing of the rod against the walls of the larger openings.

Thus, there is a need for a modular plastic conveyor belt that can resist wear at the hinge for a long operating life even in abrasive environments.

SUMMARY

This need and other needs are satisfied by a modular plastic conveyor belt embodying features of the invention. One version of the belt comprises a series of rows of plastic belt modules. Each row includes at least one belt module that extends from a forward end to a rearward end in the direction of belt travel. Each row also includes a first set of hinge eyes along its forward end and a second set of hinge eyes along its rearward end. The first set of hinge eyes have first openings formed in them, and the second set of hinge eyes have second openings. The rows are arranged end to end with the first set of hinge eyes of a row interleaved and aligned with the second set of hinge eyes of an adjacent row. The belt also comprises a plurality of hinge rods. Each hinge rod is a sectorial portion of a circular cylinder having a radius measured from a central axis. The sectorial portion subtends a first angle from the central axis. Each of the first openings has a shape similar to the cross section of the hinge rods with a slightly greater radius to receive a hinge rod with little clearance. Each of the second openings has the shape of a sector of a circle having a slightly greater radius than the hinge rod and subtends a second angle greater than the first angle. A hinge rod received in the first openings of the first set of hinge eyes of a row and in the second openings of the second set of hinge eyes of an adjacent row to form a hinge joint between adjacent rows.

A second version of a modular plastic conveyor belt also comprises a series of rows of plastic belt modules. Each row includes at least one belt module that extends from a forward end to a rearward end in the direction of belt travel. A first set of hinge eyes is formed along the forward end of each row, and a second set of hinge eyes, along the rearward end. The first hinge eyes have first openings in them, and the second hinge eyes have second openings. The rows are arranged end to end with the first set of hinge eyes of a row interleaved and aligned with the second set of hinge eyes of an adjacent row. The first and second openings are generally sector-shaped. The first openings subtend a first angle from the vertex of the sector. The second openings subtend a greater second angle from the vertex of the sector. A plurality of hinge rods, each having a generally sector-shaped cross section similar in shape and size to the first openings, are received in the aligned first and second openings of the interleaved first and second hinge eyes of adjacent rows to interconnect the rows at hinge joints into a modular plastic conveyor belt. Each hinge rod defines an axis that is perpendicular to its sector-shaped cross section through the sector-shaped cross section's vertex.

Yet another version of a belt embodying features of the invention comprises a series of rows of plastic belt modules. Each row includes at least one belt module that extends from a forward end to a rearward end in the direction of belt travel. Each row has a first set of hinge eyes along the forward end and a second set of hinge eyes along the rearward end. The first hinge eyes have first openings therethrough, and the second hinge eyes have second openings. The rows are arranged end to end with the first set of hinge eyes of a row interleaved and aligned with the second set of hinge eyes of an adjacent row. The conveyor belt also comprises a plurality of hinge rods. Each hinge rod includes a convex outer face, a first outer end face, and a second outer end face. The convex outer end face extends circumferentially through a first angle between a first edge and a second edge of the hinge rod and axially to define the length of the rod. The first outer end face extends radially inward from the arcuate outer face at the first edge, and the second outer end face extends radially inward from the arcuate outer face at the second edge. A groove is formed in the hinge rod opposite the convex outer face. The groove extends axially along the hinge rod between the first and second outer end faces. Each of the first openings has a shape similar to the cross section of the hinge rods to receive a hinge rod with little clearance. Each of the second openings subtends a second angle greater than the first angle. A hinge rod received in the first openings of the first set of hinge eyes of a row and in the second openings of the second set of hinge eyes of an adjacent row connects adjacent rows together at a hinge joint. Each of the hinge eyes has a protrusion in the opening received in the groove in the received hinge rod to register the hinge rod in the first and second openings.

Another version of a modular plastic conveyor belt comprises a series of rows of one or more plastic belt modules. Each row extends from a forward end to a rearward end in the direction of belt travel and includes a first set of hinge eyes along the forward end and a second set of hinge eyes along the rearward end. The first set of hinge eyes each have first openings, and the second set of hinge eyes each have second openings. The rows are arranged end to end with the first set of hinge eyes of a row interleaved and aligned with the second set of hinge eyes of an adjacent row. The conveyor belt further comprises a plurality of hinge rods. Each hinge rod includes an arcuate outer face, a first flat outer face, and a second flat outer face. The arcuate outer face forms a portion of a cylinder. It extends circumferentially through a first angle between a first edge and a second edge of the hinge rod and axially to define the length of the rod. The first flat outer face extends radially inward from the arcuate outer face at the first edge, and the second flat outer face extends radially inward from the arcuate outer face at the second edge. Each of the first openings has a shape similar to the cross section of the hinge rods with slightly greater dimensions to receive a hinge rod with little clearance. Each of the second openings has slightly greater radial dimensions than the hinge rod and subtends a second angle greater than the first angle so that a hinge rod received in the first openings of the first set of hinge eyes of a row and in the second openings of the second set of hinge eyes of an adjacent row forms with the hinge eyes a hinge joint between adjacent rows.

Another aspect of the invention provides a hinge rod for connecting adjacent rows of a conveyor belt together through aligned hinges eyes forming a hinge between adjacent rows. The hinge rod comprises an arcuate outer face that forms a portion of a cylinder. The hinge rod extends circumferentially over a first angle and axially to define the length of the hinge rod. A groove is formed in the hinge rod opposite the arcuate outer face. The groove extends axially along the hinge rod.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
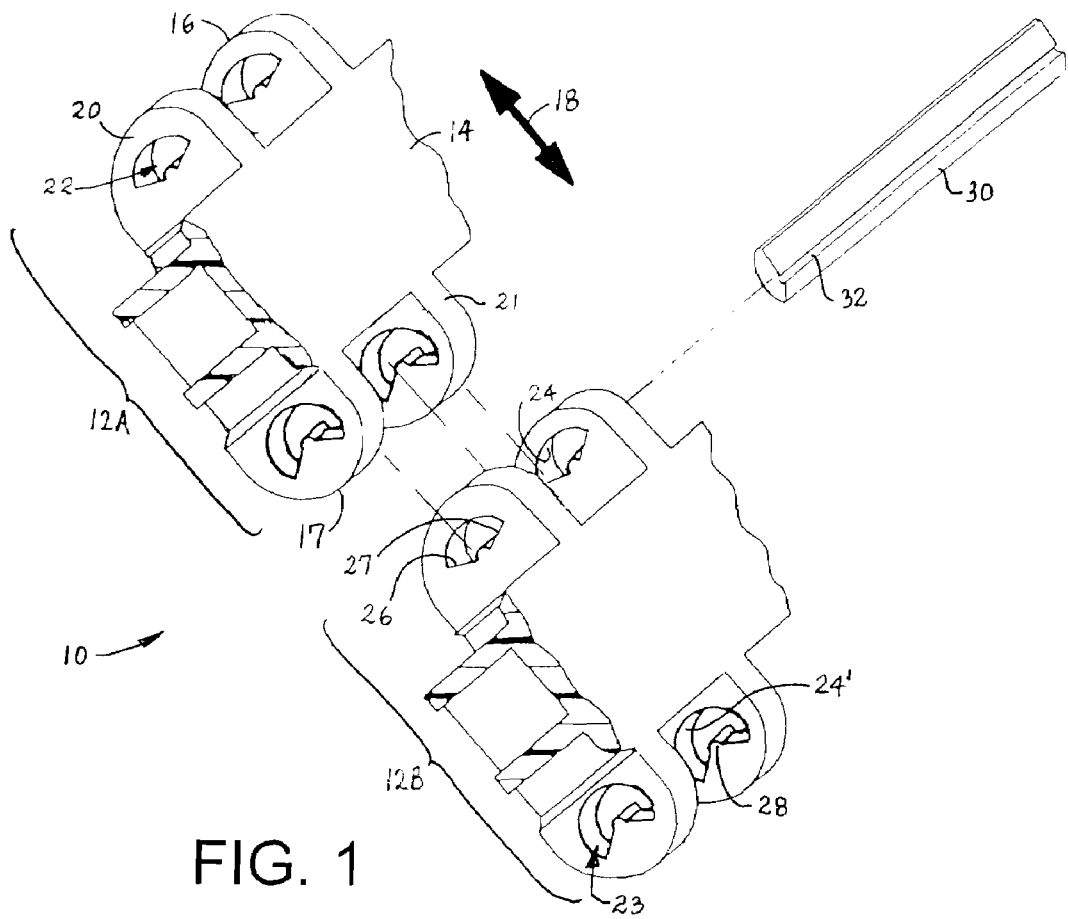
FIG. 1 is an exploded isometric view of a portion of a modular plastic conveyor belt embodying features of the invention, including an abrasion-resistant hinge rod.

A portion of a modular plastic conveyor belt embodying features of the invention is shown in FIG. 1. The belt 10 is constructed of a series of rows 12A, 12B of one or more belt modules 14. Each row extends from a forward end 16 to a rearward end 17 in a direction of belt travel 18. A first set of hinge eyes 20 is disposed along the forward end of each belt row; a second set 21 is disposed along the rearward end. First openings 22 are formed in the first hinge eyes, and larger second openings 23 are formed in the second hinge eyes. The first and second openings are each bounded by an arcuate wall 24, 24' and a pair of end walls 26, 27 to define a generally sector-shaped opening. A protrusion 28 forms a ridge extending into the openings between the two end walls. A hinge rod 30 received in the first openings 22 of the first hinge eyes 20 of a trailing row 12B and in the second openings 23 of the interleaved and aligned second hinge eyes 21 of a leading row 12A connects the adjacent rows together at a hinge joint. The cross section of the hinge rod is geometrically similar to the cross section of the first openings in the first hinge eyes. The dimensions of the first openings and the radial dimensions of the second openings are slightly greater than the cross section of the hinge rod to allow for easy insertion of the hinge rod into the hinge joint. There is little clearance for the hinge rod in the first openings to minimize rubbing between the rod and the walls of the first openings during operation of the belt. A groove 32 formed axially along the hinge rod receives the protrusions in the first and second openings to register the rod in place within the aligned openings and to limit the amount of clearance in the second openings and, consequently, rubbing between rod and eye walls, which can accelerate wear, especially in an abrasive environment.

Figure 2:
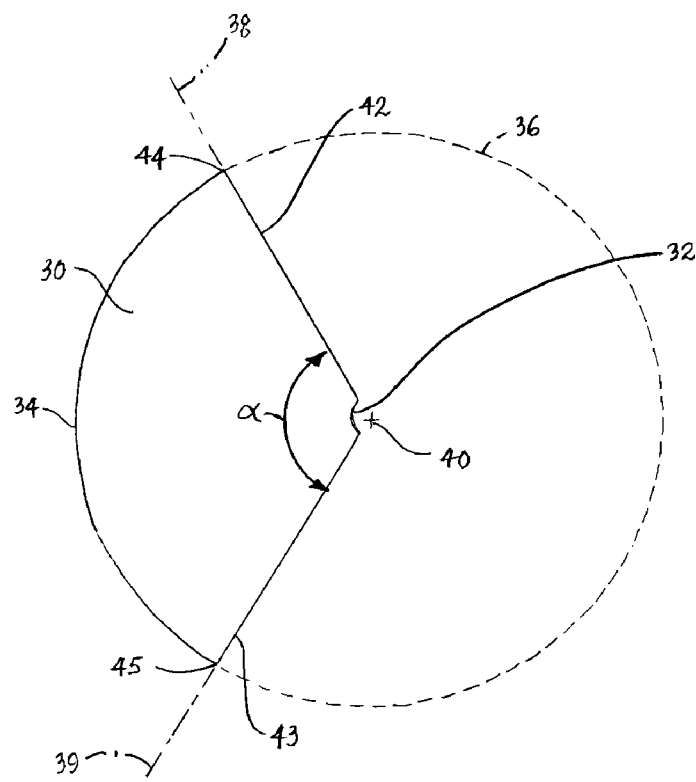
FIG. 2 is an end view of the hinge rod of FIG. 1.
Figure 3:
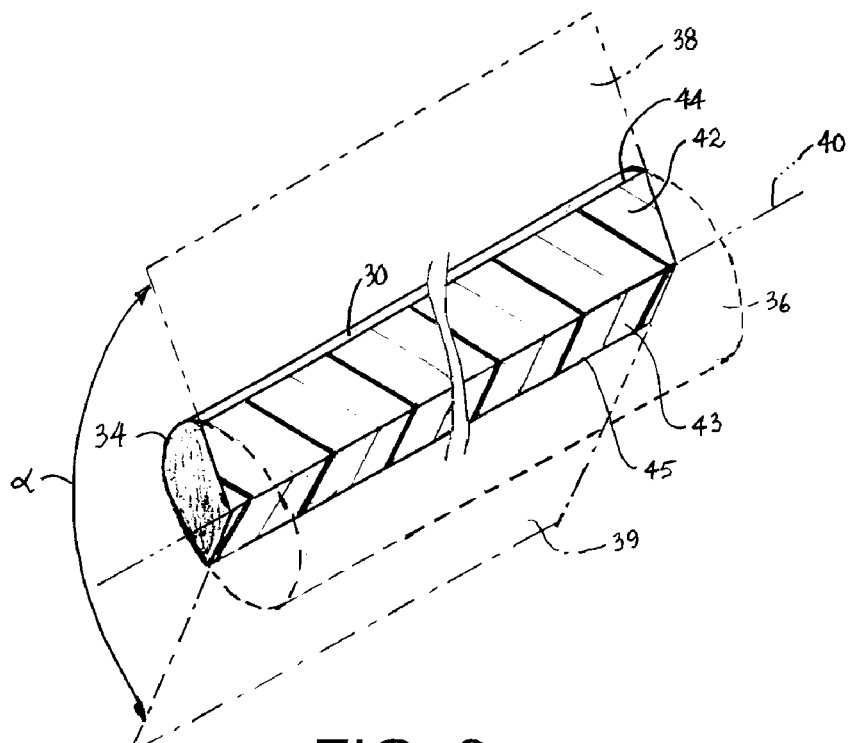
FIG. 3 is an isometric view of the hinge rod of FIG. 1 showing how its shape is formed.

The shape of a preferred version of the hinge rod is shown in FIGS. 2 and 3. The hinge rod 30 has a convex arcuate outer face 34, which is a portion of the outside surface 36 of a circular cylinder. Two imaginary half-planes 38, 39 intersecting the cylinder at its axis 40 define a first angle $\alpha$, which is preferably between 90° and 180°. The arcuate outer face extends circumferentially through the first angle. First and second flat end faces 42, 43 lie in the two half-planes and intersect the outer face 34 at first and second edges 44, 45. The hinge rod's groove (32 in FIG. 2, but not shown in FIG. 3) extends axially along the rod opposite to its arcuate outer face 34. Thus, in cross section perpendicular to its length axis, the hinge rod is generally sector-shaped, bounded by a circular arc 34, a pair of linear segments 42, 43 extending radially inward of the circular arc toward a vertex lying on the length axis 40, and the perimeter of an axial groove 32 disposed along the axis between the two linear segments.

The hinge rod is preferably made of a plastic material such as polypropylene, polyethylene, or nylon. It may be extruded or molded. The groove may be formed in the extrusion or molding process or machined in a secondary manufacturing step. The belt modules are preferably modular plastic modules molded out of thermoplastic polymers, such as polyethylene, polypropylene, acetal, or composite polymers, in an injection-molding process.

Figure 4:
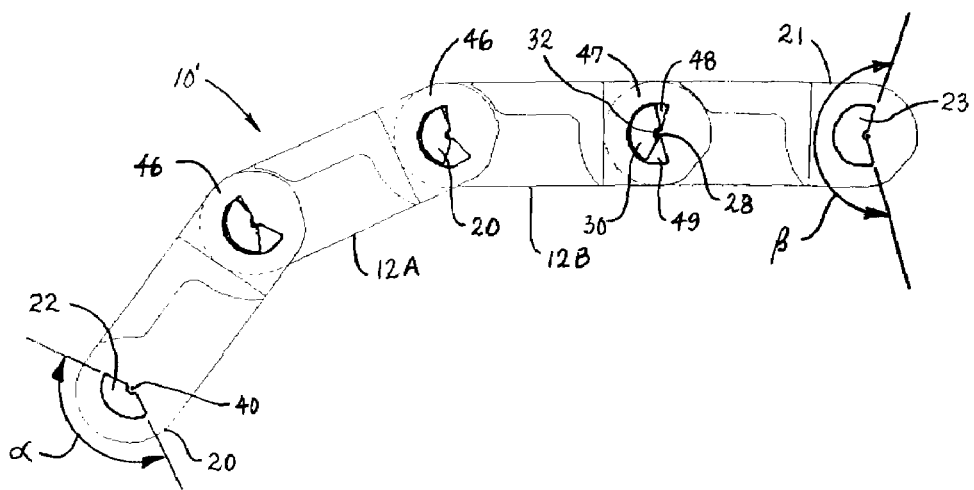
FIG. 4 is a side elevation view of a portion of the conveyor belt of FIG. 1 in articulation.

The articulation of a portion of a conveyor belt, for example, about a sprocket, is shown in FIG. 4. Two hinge joints 46 are shown in articulation; another hinge joint 47 is shown not articulating. The first openings 22 in the first hinge eyes 20 subtend a first angle $\alpha$ from the vertex 40 of the sector-shaped opening. The second openings 23 in the second hinge eyes 21 subtend a second angle $\beta$ from the vertex. The first angle $\alpha$, as shown, is between 90° and 180°. The second angle $\beta$, as shown, is greater than 180°. Consequently, when the openings in interleaved hinge eyes are aligned at a non-articulating hinge joint 47, the hinge rod 30 confined in the smaller first openings 22 is generally centered within the larger first openings with upper and lower unfilled spaces 48, 49 available for articulation. The protrusions 28 received in the groove 32 of the hinge rod register the hinge rod in position and limit the vertical clearance of the rod in the openings, especially in the larger second openings, to minimize rubbing between the rod and the walls of the hinge eyes. At an articulating hinge joint 46, the leading row 12A rotates about the hinge rod 20, which rides up into the upper space 48 of the second openings 23. Of course, while the upper space decreases because of the presence of the hinge rod, the lower space correspondingly increases. When the belt backbends, the hinge rod conversely fills the lower space and opens the upper space as the belt articulates at the hinge joint in the opposite direction.

Although the invention has been described in detail with respect to a preferred version, other versions are possible. For example, the angular extent of the hinge rods and the smaller openings, which was shown as between 90° and 180°, could be less than 90° or greater than 180° in certain applications. The angular extent of the larger second openings could be less than 180° if the range of articulation needs to be limited. As another example, the first and second openings can be arranged so that, viewed at a non-articulating hinge joint, the hinge rod in the first openings is not centered with respect to the larger second openings to allow, for example, a greater degree of articulation than backbending or to eliminate backbending altogether. As yet another example, the arcuate walls bounding the first openings were shown oriented closer to the end of the belt row than the protrusions and the arcuate walls bounding the second openings were shown oriented farther from the end of the belt row than the protrusions. The orientations of the first and second openings could both be reversed without affecting the ability of the belt to articulate. So, as these few examples suggest, the scope of the claims is not meant to be limited to the preferred version described in detail.

What is claimed is:

1. A modular plastic conveyor belt comprising:
a series of rows of plastic belt modules wherein each row includes at least one belt module extending from a forward end to a rearward end in the direction of belt travel and including a first set of hinge eyes along the forward end and a second set of hinge eyes along the rearward end, wherein the first set of hinge eyes have first openings therethrough and wherein the second set of hinge eyes have second openings therethrough, the rows being arranged end to end with the first set of hinge eyes of a row interleaved and aligned with the second set of hinge eyes of an adjacent row;
a plurality of hinge rods, wherein each hinge rod is a sectorial portion of a circular cylinder having a radius measured from a central axis and the sectorial portion subtends a first angle from the central axis;
wherein each of the first openings has a shape similar to the cross section of the hinge rods with a slightly greater radius to receive a hinge rod with little clearance and wherein each of the second openings has the shape of a sector of a circle having a slightly greater radius than the hinge rod and subtends a second angle greater than the first angle so that a hinge rod received in the first openings of the first set of hinge eyes of a row and in the second openings of the second set of hinge eyes of an adjacent row forms a hinge joint between adjacent rows.

2. A modular plastic conveyor belt as in claim 1 wherein each hinge rod further includes a groove extending along the central axis and wherein each of the first and second hinge eyes has a protrusion extending into the first and second openings and received in the groove of the received hinge rod.

3. A modular plastic conveyor belt as in claim 1 wherein the first angle is between 90° and 180°.

4. A modular plastic conveyor belt as in claim 1 wherein the second angle is greater than 180°.

5. A modular plastic conveyor belt comprising:
a series of rows of plastic belt modules wherein each row includes at least one belt module extending from a forward end to a rearward end in the direction of belt travel and including a first set of hinge eyes along the forward end and a second set of hinge eyes along the rearward end, wherein the first set of hinge eyes have first openings therethrough and wherein the second set of hinge eyes have second openings therethrough, the rows being arranged end to end with the first set of hinge eyes of a row interleaved and aligned with the second set of hinge eyes of an adjacent row;
wherein the first openings are generally sector-shaped and subtend a first angle from the vertex of the sector;
wherein the second openings are generally sector-shaped and subtend a second angle from the vertex of the sector, wherein the second angle is greater than the first angle;
a plurality of hinge rods, each having a generally sector-shaped cross section similar in shape and size to the first openings and defining an axis perpendicular to the generally sector-shaped cross section through the vertex of the sector-shaped cross section, received in the aligned first and second openings of the interleaved first and second hinge eyes of adjacent rows to interconnect the rows at hinge joints into a modular plastic conveyor belt.

6. A modular plastic conveyor belt as in claim 5 wherein each hinge rod further includes a groove extending along the axis and wherein each of the first and second hinge eyes has a protrusion extending into the first and second openings and received in the groove of the received hinge rod.

7. A modular plastic conveyor belt as in claim 5 wherein the first angle is between 90° and 180°.

8. A modular plastic conveyor belt as in claim 5 wherein the second angle is greater than 180°.

9. A modular plastic conveyor belt comprising:
a series of rows of plastic belt modules wherein each row includes at least one belt module extending from a forward end to a rearward end in the direction of belt travel and including a first set of hinge eyes along the forward end and a second set of hinge eyes along the rearward end, wherein the first set of hinge eyes have first openings therethrough and wherein the second set of hinge eyes have second openings therethrough, the rows being arranged end to end with the first set of hinge eyes of a row interleaved and aligned with the second set of hinge eyes of an adjacent row;
a plurality of hinge rods, wherein each hinge rod includes:
a convex outer face extending circumferentially through a first angle between a first edge and a second edge of the hinge rod and axially to define the length of the rod;
a first outer end face extending radially inward from the arcuate outer face at the first edge; and
a second outer end face extending radially inward from the arcuate outer face at the second edge;
a groove opposite the convex outer face extending axially along the hinge rod between the first and second outer end faces;
wherein each of the first openings has a shape similar to the cross section of the hinge rods to receive a hinge rod with little clearance and wherein each of the second openings subtends a second angle greater than the first angle so that a hinge rod received in the first openings of the first set of hinge eyes of a row and in the second openings of the second set of hinge eyes of an adjacent row connects adjacent rows together at a hinge joint; and
wherein each of the hinge eyes has a protrusion in the opening received in the groove in the received hinge rod to register the hinge rod in the first and second openings.

10. A modular plastic conveyor belt as in claim 9 wherein the first angle is between 90° and 180°.

11. A modular plastic conveyor belt as in claim 9 wherein the second angle is greater than 180°.

12. A modular plastic conveyor belt comprising:
a series of rows of plastic belt modules wherein each row includes at least one belt module extending from a forward end to a rearward end in the direction of belt travel and including a first set of hinge eyes along the forward end and a second set of hinge eyes along the rearward end, wherein the first set of hinge eyes have first openings therethrough and wherein the second set of hinge eyes have second openings therethrough, the rows being arranged end to end with the first set of hinge eyes of a row interleaved and aligned with the second set of hinge eyes of an adjacent row;

a plurality of hinge rods, wherein each hinge rod includes:
   an arcuate outer face forming a portion of a cylinder and extending circumferentially through a first angle between a first edge and a second edge of the hinge rod and axially to define the length of the rod;
   a first flat outer face extending radially inward from the arcuate outer face at the first edge; and
   a second flat outer face extending radially inward from the arcuate outer face at the second edge;

wherein each of the first openings has a shape similar to the cross section of the hinge rods with slightly greater dimensions to receive a hinge rod with little clearance and wherein each of the second openings has slightly greater radial dimensions than the hinge rod and subtends a second angle greater than the first angle so that a hinge rod received in the first openings of the first set of hinge eyes of a row and in the second openings of the second set of hinge eyes of an adjacent row forms with the hinge eyes a hinge joint between adjacent rows.

13. A modular plastic conveyor belt as in claim 12 wherein the first angle is between 90° and 180°.

14. A modular plastic conveyor belt as in claim 12 wherein the second angle is greater than 180°.

15. A modular plastic conveyor belt as in claim 12 wherein the hinge rod further includes a groove opposite the arcuate outer face extending axially along the hinge rod between the first and second flat outer faces and wherein each of the first and second hinge eyes has a protrusion extending into the first and second openings and received in the groove of the received hinge rod.

16. A hinge rod for connecting adjacent rows of a conveyor belt together through aligned hinge eyes forming a hinge between adjacent rows, the hinge rod comprising:
   an arcuate outer face forming a portion of a circular cylinder and extending axially to define the length of the hinge rod and circumferentially over an angle between a pair of linear-segment surfaces extending radially inward from the outer face; and
   a groove disposed radially inward of the arcuate outer face and extending axially along the hinge rod and circumferentially over the angle to radially inward ends of the linear-segment surfaces.

* * * * *